United States Patent [19]
Parson et al.

[11] 4,083,726
[45] Apr. 11, 1978

[54] MAGNESIUM CONTAINING PROTECTIVE COATING FOR FERROUS METAL

[75] Inventors: Lee Minus Parson, Inglewood; Eugene R. du Fresne, Sierra Madre, both of Calif.

[73] Assignee: Ameron, Inc., Monterey Park, Calif.

[21] Appl. No.: 690,974

[22] Filed: May 28, 1976

[51] Int. Cl.² .................................................. C09D 5/10
[52] U.S. Cl. ............................ 106/14.41; 106/193 M; 106/14.44; 149/37
[58] Field of Search .............................. 149/37, 19.7; 252/389 R; 106/14, 193 M

[56] References Cited

U.S. PATENT DOCUMENTS

| | | | |
|---|---|---|---|
| 2,933,400 | 4/1960 | Wurbs | 106/14 |
| 2,988,438 | 6/1961 | Allovio | 149/37 |
| 3,067,045 | 12/1962 | McMahon | 106/14 |
| 3,094,445 | 6/1963 | Busk et al. | 149/37 |
| 3,118,048 | 1/1964 | Fisher et al. | 106/193 M |
| 3,257,801 | 6/1966 | Martinez et al. | 149/37 |
| 3,625,855 | 12/1971 | Douda | 149/37 |
| 3,839,051 | 10/1974 | Cerveny | 106/14 |

OTHER PUBLICATIONS

Uhlig, *The Corrosion Handbook*, pp. xxviii–xxx, 20–33 and 905–908, John Wiley & Sons, Inc. (1948) New York.

*Primary Examiner*—Edward A. Miller
*Attorney, Agent, or Firm*—Christie, Parker & Hale

[57] ABSTRACT

A coating for protecting steel from corrosion is a mixture of an organic solvent and binder, powdered magnesium, and a passivating agent which has a pH greater than about 8 when in contact with water. Steel covered with the coating is cut or welded by the application of heat sufficient to melt the magnesium and underlying steel. In some embodiments, the pyrolysis products of the coating create an odor which warns of the build-up of nitrogen oxides produced by typical welding and coating operations.

14 Claims, No Drawings

MAGNESIUM CONTAINING PROTECTIVE COATING FOR FERROUS METAL

FIELD OF THE INVENTION

This invention relates to an organic, magnesium-rich protective coating for ferrous surfaces, and to the method of cutting or welding steel parts so coated.

DESCRIPTION OF THE PRIOR ART

Preconstruction primers or coatings for steel plate have been used in shipyards and the like for a number of years to protect the steel from corrosion during storage and pending fabrication of the plates into a finished product. Such fabrication ordinarily requires cutting with a torch and welding.

Typically, steel plate is subjected to automatic blasting and coating of its surface to protect against corrosion while awaiting construction. A good preconstruction primer should reduce the cost of surface preparation by allowing for a minimum amount of automatic blasting, followed by simple application of the coating material before fabrication. This avoids the alternative operation of blasting in subassembly or completed stages, which slows other work, and often would contaminate equipment and machinery.

The coating should readily form a film thickness between 0.5 and 4 mils, with good adhesion to shot-blasted steel. Moreover, the coating should dry rapidly to form a film which is dry-to-the-touch within three minutes after application. The coating should also become resistant to water within that time. This fast-drying of the coating is necessary to permit blasting and coating of the steel surfaces at an economically acceptable rate.

The coating should also not interfere significantly with subsequent cutting or welding operations.

Zinc-rich protective coatings, such as those described in U.S. Pat. No. 3,615,730, have been widely accepted for the protection of ferrous surfaces against corrosion.

Zinc-rich preconstruction primers, whatever their merits, have two substantial defects. They tend to slow oxygen-cutting of the underlying steel, and they tend to produce porous, brittle welds in the steel. Cutting and welding are the principal operations in ship construction, so that the use of a zinc-rich preconstruction primer, while forestalling corrosion on the one hand, seriously impedes subsequent cutting and welding operations.

Zinc evaporates rapidly at cutting and welding temperatures for steel. This drops the temperature of the cutting torch flame so that it is hard to start the burning of the underlying steel plate. The evaporating zinc also substantially reduces the rate at which the coated steel can be cut. The effect of zinc on welding is even worse. The porosity and weaknesses of welds made through zinc-rich preconstruction primer apparently is also a function of the volatility of the zinc.

Magnesium evaporates at a substantially lower rate than zinc at the kindling-point of iron. Moreover, it oxidizes in situ, and therefore adds to the applied heat at the site of cutting or welding, rather than decreasing it, as does the more volatile zinc. However, the substitution of powdered magnesium for powdered zinc is not a simple matter. For example, if magnesium is substituted for zinc in a conventional alkali silicate binder, the resulting coating is highly flammable. On the other hand, prior-art ethylsilicate binders react with metallic magnesium under the torch to form forsterite, a high-temperature refractory mineral, which blocks cutting and welding. Magnesium oxide alone is also refractory, but it is soluble in iron oxide, both molten and solid. Forsterite is not soluble in iron oxide, and thus interferes with welding and cutting.

Magnesium-rich protective coatings have been suggested to prevent rusting. U.S. Pat. No. 2,933,400 is an example of such a coating, which includes linseed oil as a binder, powdered magnesium, powdered iron, activated charcoal, and magnesium oxide. This product is not satisfactory as a preconstruction primer because it takes many hours to set, and uses a relatively large amount of magnesium powder, which is expensive.

These and other shortcomings of the prior art are overcome by the protective coating of this invention. The coating uses a relatively small amount of magnesium powder, and dries quickly to form a hard film in less than three minutes. It also permits cutting and welding of the steel plate at approximately the same speed, and with substantially the same quality, as that of bare steel.

SUMMARY OF THE INVENTION

The protective coating of the present invention is a mixture of magnesium powder, a non-saponifiable organic binder, and a passivating compound which, on contact with water, has a pH of at least about 8 and less than about 13.

Preferably, the organic binder is a water-insoluble, alcohol-soluble cellulose derivative, such as a cellulose acetate-propionate, or an acetate-butyrate, and the like. Other binders, such as acrylics, ketone-soluble phenolic type binders, and conventional lacquers, are also practical from a technical standpoint. The alcohol-soluble binders are preferred because of the growing medical objections to ketone solvents, and because the acrylic resins are more expensive. However, the use of some ketone in the solvent is desirable because it accelerates the drying of the coating so that it is hard-to-the-touch within three minutes, even though the coating thickness is more than 2 mils. Thus, by using an alcohol-soluble cellulose derivative, in a solution which is a mixture of alcohols and ketones, the coating dries to nearly full hardness (not merely to-the-touch hardness) in 30 seconds.

This invention has the further advantage that it is a one-package system, with no need for a mixing step immediately before use. It also avoids the hazards of storing dry magnesium powder. A further advantage of the alcohol-ketone solvent system is that it contains no aromatic compounds, many of which are prohibited as being environmentally hazardous. Finally, the proportion of ketone can be made as low as necessary to comply with industrial health regulations.

As stated earlier, one of the disadvantages of powdered magnesium is that it is expensive, making a coating in which magnesium is merely substituted for zinc uneconomical compared to the zinc-rich silicate coatings of the prior art.

An important aspect of this invention is that it reduces the percentage of magnesium powder used in the coating without impairing the quality of its corrosion resistance. It has long been thought by the prior art that metal-filled protective coatings are galvanically protective at all times, and that particle-to-particle contact (i.e., a high volume loading of metal particles) is necessary to assure this protection by providing a conductive path through the coating. Hence, prior art coatings have been loaded with as much powdered protective metal as possible. We have learned that this is not necessary, and that a large proportion of the protective metal can be replaced with a less expensive passivating pigment or agent and still maintain the protective quality of the coating. However, some magnesium powder is still required, to provide galvanic protection when the surface is scratched, impacted, or abraded. Moreover, the magnesium powder aids subsequent cutting and welding of the steel plate, instead of hindering those operations, as does the zinc in the prior-art coatings.

The passivating pigments or agents must of course be compatible with the rest of the system. It might be thought, for example, that zinc compounds would be incompatible with powdered magnesium in a preconstruction primer system, because the high temperatures of the cutting and welding processes would cause the magnesium to reduce the zinc compounds, thereby producing zinc vapor. Our work has shown that the magnesium oxidizes in situ, and that no objectionable reduction of the zinc compounds takes place. It also might be thought that zinc compounds takes place. It also might be thought that strong oxidizing agents such as chromates would attack the magnesium at room temperature, and thereby destroy its effectiveness. In practice, the reaction is so slow that it is no problem.

In the preferred embodiment of the invention, the selection of the correct passivating agents permits the magnesium content of the coating composition to be reduced to as little as 4% by weight, or even less. Examples of the passivating agents which may be used are the oxides, hydroxides, phosphates, chromates, carbonates and molybdates of zinc or magnesium. The carbonates, chromates, molybdates and phosphates of barium and calcium can also be used. In general, the passivating compound, when dissolved in water, should have a pH of at least about 8, and preferably between about 9 and about 13. The use of these passivating compounds, in the limited amounts required to achieve the passivating action, does not seriously affect the principal properties of the coating, namely, corrosion resistance, cuttability, and weldability.

The magnesium powder can be of any suitable size range, depending to some extent on the thickness of the final coating. Ordinarily, magnesium powder from about 100 mesh down to 5 microns is satisfactory.

The following table shows three protective coating formulations made in accordance with the present invention.

TABLE

| Ingredients (% by wt.) | C-634 | C-640 | C-681 |
|---|---|---|---|
| Cellulose-acetate-butyrate* | 9.00 | 9.00 | — |
| Cellulose-acetate propionate** | — | — | 9.00 |
| $Zn_3(PO_4)_2 \cdot 2H_2O$ | 6.75 | 6.00 | 9.00 |
| $Fe_2O_3$ | 10.00 | 3.25 | 2.55 |
| $ZnCrO_4$ | 0.50 | 0.50 | 0.40 |
| Beetle 227-8 reinforcing resin | 1.00 | 1.00 | — |
| ZnO | — | 0.50 | — |
| $CaCO_3$ | — | 3.00 | — |
| Mg, 325 mesh | 11.00 | 11.00 | 11.00 |
| Methanol | 30.88 | 32.88 | 34.03 |
| Acetone | 30.88 | 32.88 | 34.03 |

*Supplied by Eastman Kodak Co. as Eastman 553-0.4
**Supplied by Eastman Kodak Co. as Eastman 504-0.2

Several hundred variations of the invention were formulated and tested in the course of our investigation, but the above examples will suffice to demonstrate the present invention. Even the worst performing formulation made in accordance with this invention is superior to the best example of a zinc-rich inorganic preconstruction primer in cutting quality, weldability, and adhesion.

The above proportions are not critical. The amount of magnesium can be doubled or halved without serious effect. However, cost increases without much benefit, if the amount of magnesium is increased. Some cost saving can be effected by reducing the amount of magnesium, at the risk of losing some galvanic protection. In general, formulation C-681 is satisfactory in every respect, except for the warning odor discussed below. The passivating compound (or mixtures of them) should be present at least in the amount needed to provide a pH between about 8 and about 13 wherever the coating might come in contact with moisture. To this end, the binder should be non-saponifiable to prevent its reaction with the alkaline passivating compound.

Working definitions of "weldability" and "cuttability" as used in the context of this invention are as follows. A good weld is stronger than the metal welded. It is neither brittle nor porous. If a coated piece of steel can be welded as readily as a similar piece of bare steel, with the production of the same quality of weld, and the production rate (in inches of seam welded per minute) being the same, the coating is said to be weldable. The first sign of a departure from weldability is the need to reduce production rate to maintain the quality of the weld. If this reduction is not made, the weld will be porous, and will not be stronger than the metal welded.

In the oxygen cutting of steel, a coating is "cuttable" or "free-cutting" if a "production cut" or "quality cut" can be made through the steel covered with this coating at the same rate as it could be made through a similar piece of steel free of any coating. The "production cut" is straight, smooth, even, and accurate, without excessive slag adhering to its edge. What slag there may be should readily fall off when the cooled metal is tapped with a tool such as a screwdriver. The transition from a production cut to one of low quality is quite abrupt, especially when automatic equipment is used. The sudden onset of a wavering stream of oxygen in the steel, producing a jerky, erratic cut with large amounts of tightly adherent slag, is not only a sign that some critical value of a parameter (such as cutting speed) has been passed, but a danger signal portending the abrupt cessation of all cutting action. In many cases, automatic equipment does not exhibit this transient condition of irregular cutting. The cutting action stops without warning.

Rating coatings that do not produce quality cuts at the top production rate obtained with bare steel is made on the basis of the production rates at which they will consistently give quality cuts. Typically, an automatic cutting torch set to operate at an oxygen pressure of 10 psig and an auxiliary fuel (natural gas) pressure at 3 psig cuts ⅜ inch bare steel plate at the rate of about 20 inches/min. Without losing the cut, the cut being of production quality.

We found that a ⅜ inch steel plate covered with a dried coating of example C-640 (set forth in the above Table) 2.31 mils thick could be cut at 20 inches/min., while C-634 at 3.05 mils could be cut at 17 inches/min. Since most of the formulations with which we worked showed little dependence of cuttability upon film thickness, we concluded that C-640 was superior to C-634.

However, a ⅜ inch steel plate covered with a zinc-rich coating will not cut at all at these thicknesses under the identical conditions. At an average thickness under 1 mil (where there is considerable likelihood that the coating is not continuous), ⅜ inch steel plate covered with a conventional zinc-rich preconstruction primer can be cut at perhaps 17 inches/min., although 12–15 inches/min. is more likely. Zinc-rich coatings are extremely sensitive to film thickness. A ⅜ inch steel plate covered with a zinc-rich coating more than 1.5 mils thick is virtually uncuttable. The same steel plate covered with coatings made in accordance with our invention can be cut, at bare-steel speeds, up to thicknesses as great as 15 mils, which is unheard-of with conventional preconstruction primers.

There is an appreciable difference in odor of the by-products when the coatings given in the above Table are cut or welded. Pyrolysis of the cellulosic binder produces butyric and acetic acids for the formulations using cellulose acetate-butyrate. Butyric acid has the smell of rancid butter, and acetic acid that of vinegar. In formulation C-640, some proportions of these carboxylic acids reacted with the calcium carbonate, thus reducing the odor. These acid fumes are not a toxic hazard. However, the nitrogen oxides produced during the cutting and welding are serious health problems. If the work space is properly ventilated to remove all hazardous concentrations of the nitrogen oxides, the butyric acid and acetic acid odors are not noticeable. Thus, the odor of the carboxylic acids is a good warning signal for the relatively odorless, but far more toxic, nitrogen oxides.

In cutting, much of the pyrolysis product is aspirated into the oxygen stream and burned. Moreover, shipyard practice is to cut the steel in open air. The problem is thus more acute with welding, and, in particular, welding in a confined space, such as the interior of a tank or a ship's hold. Under such circumstances, the odor of the pyrolysis products can be overpowering, and the nitrogen oxides hazard unacceptable. Thus, even though the nitrogen oxides might not be discernible to the welder, he will be aware of the acetic acid and butyric acid, and be compelled to make use of a safe air supply.

The substitution of cellulose acetate-propionate (C-681) substantially eliminates all objectionable odor. The proprionic acid odor is less objectionable, and apparently the acid is less efficiently cleaved from the polymer by pyrolysis.

Formulations in which a ketone-soluble cellulose derivative was used as a binder, and a ketone was the only solvent, were found to be satisfactory in all respects, except that objection can be made to the health hazards presented by the additional ketone.

Binders other than cellulose derivatives can also be used. For example, a base-catalyzed phenolic for the binder, and a ketone mixture for the solvent can be used. This combination is useful when a baking or other post-cure treatment is desirable at some manufacturing stage after the solvent has dried, and the coating is dry-to-the-touch. But the post-cure is not strictly necessary for shipyard purposes. On the other hand, in those manufacturing operations where a baking enamel is to be used as a topcoat, it will be preferable to have a thermoset binder rather than a lacquer-type binder.

The coating of this invention is an ideal preconstruction primer for application to freshly blasted steel plates in a continuous mass-production process, such as that employed in shipyards. The same coating, or appropriate variants of it, is also useful in other sectors of the construction and manufacturing industries wherever it is advisable to coat steel before oxygen cutting or welding.

We claim:

1. A protective coating for protecting an underlying steel surface from corrosion, the coating having a thickness of at least 0.5 mil and consisting essentially of magnesium powder, a passivating compound which reacts with the surface to form a protective film for the surface, the passivating compound on contact with water having a pH of at least about 8, and a non-saponifiable organic binder for binding the magnesium powder and the passivating compound to the underlying surface.

2. A protective coating according to claim 1 in which the organic binder is water-insoluble and soluble in an organic solvent having less than about 7 carbon atoms per molecule.

3. A protective coating according to claim 1 in which the binder is a cellulose derivative.

4. A protective coating according to claim 3 in which the binder is cellulose acetate-butyrate.

5. A protective coating according to claim 3 in which the cellulose derivative is soluble in an alcohol having less than about 7 carbon atoms per molecule.

6. A protective coating according to claim 3 in which the cellulose derivative is soluble in a ketone having less than about 7 carbon atoms per molecule.

7. A composition for preparing a protective coating for protecting a steel surface from corrosion, the composition consisting essentially of a mixture of magnesium powder, a passivating compound which reacts with the surface to form a protective film for the surface, the passivating compound on contact with water having a pH of at least about 8, and a binder which comprises a solution of a cellulose derivative in a mixture of an alcohol and a ketone.

8. A protective coating according to claim 1 in which the binder is an ester of cellulose and at least one carboxylic acid.

9. A protective coating according to claim 8 in which the carboxylic acid molecules each have less than about 7 carbon atoms.

10. A protective coating according to claim 1 in which the passivating compound is selected from the group consisting of the oxide, hydroxide, phosphate, chromate, carbonate, and molybdate of zinc.

11. A protective coating according to claim 1 in which the passivating compound is selected from the group consisting of the oxide, hydroxide, phosphate, chromate, carbonate, and molybdate of magnesium.

12. A protective coating according to claim 1 in which the passivating compound is selected from the group consisting of the carbonate, chromate, molybdate, and phosphate of barium.

13. A protective coating according to claim 1 in which the passivating compound is selected from the group consisting of the carbonate, chromate, molybdate, and phosphate of calcium.

14. A protective coating according to claim 1 in which the magnesium powder is in the particle size range between about 5 microns and about 100 mesh.

* * * * *

UNITED STATES PATENT AND TRADEMARK OFFICE
CERTIFICATE OF CORRECTION

PATENT NO. : 4,083,726
DATED : April 11, 1978
INVENTOR(S) : LEE MINUS PARSON, et al It is certified that error appears in the above-identified patent and that said Letters Patent are hereby corrected as shown below:

Column 3, lines 23-24, delete "zinc compounds takes place. It also might be thought that". Column 4, line 60, "Without" should be -- without --.

Signed and Sealed this

Fifth Day of September 1978

[SEAL]

Attest:

RUTH C. MASON
*Attesting Officer*

DONALD W. BANNER
*Commissioner of Patents and Trademarks*